United States Patent [19]

Oslapas

[11] Patent Number: 5,092,417
[45] Date of Patent: Mar. 3, 1992

[54] LOCKING MECHANISM FOR A REAR WHEEL STEERING SYSTEM

[75] Inventor: Algis J. Oslapas, Dearborn Heights, Mich.

[73] Assignee: Ford Motor Company, Dearborn, Mich.

[21] Appl. No.: 620,943

[22] Filed: Dec. 3, 1990

Related U.S. Application Data

[63] Continuation-in-part of Ser. No. 550,242, Jul. 10, 1990, which is a continuation of Ser. No. 292,178, Dec. 30, 1988, abandoned.

[51] Int. Cl.$^5$ ............................................. B62D 5/04
[52] U.S. Cl. .................................. 180/79.1; 280/91; 310/13; 310/17; 318/135
[58] Field of Search ............ 180/79.1, 140, 141, 180/142; 280/91; 310/13, 17; 318/135

[56] References Cited

U.S. PATENT DOCUMENTS

| | | | |
|---|---|---|---|
| 4,782,907 | 11/1988 | Morishita et al. | 180/140 |
| 4,785,901 | 11/1988 | Maeda | 180/79.1 |
| 4,976,328 | 12/1990 | Ohmura | 280/91 |

FOREIGN PATENT DOCUMENTS

| | | | |
|---|---|---|---|
| 376458 | 7/1990 | European Pat. Off. | 180/140 |
| 55-44058 | 3/1980 | Japan . | |
| 182170 | 7/1989 | Japan | 180/140 |

*Primary Examiner*—Mitchell J. Hill
*Attorney, Agent, or Firm*—Raymond L. Coppiellie; Roger L. May

[57] ABSTRACT

A steering gear for an automotive vehicle comprises a linear electric motor electrically connected to a power source within the vehicle. The motor includes a housing, a plunger operative to move reciprocally within a stator, the plunger being linked to an axle set of roadwheels. The motor further includes a locking member meshingly engageable with the plunger and mechanism means for driving the locking member into meshing engagement with the plunger so that upon interruption of electrical power to the motor, a locking member engages the plunger to prevent the plunger from reciprocally moving within the stator.

13 Claims, 3 Drawing Sheets

1

LOCKING MECHANISM FOR A REAR WHEEL STEERING SYSTEM

BACKGROUND OF THE INVENTION

This application is a continuation-in-part of Ser. No. 550,242, filed July 10, 1990 which is a continuation of Ser. No. 292,178 filed Dec. 30, 1988, now abandoned.

FIELD OF THE INVENTION

The present invention relates generally to a motor-driven power steering system for the rear roadwheels of a vehicle. More particularly, the present invention relates to a linear electric motor-driven steering gear for steering the rear wheels of a vehicle wherein the steering gear includes a mechanism for locking the linear motor in the event of a failure of the steering system.

DISCLOSURE INFORMATION

Power assisted steering systems have been employed in automotive vehicles for a number of years. One common type of power assisted steering utilizes a hydraulic pump driven by the crankshaft of the vehicle engine, with the pump being operatively connected with the steering gear to provide a hydraulic boost to the driver's steering effort. Electrically driven power assist systems are also known. Electrically driven power assist systems commonly utilize control algorithms having as their inputs steering driveshaft torque and vehicle velocity. A torque sensor responds to the steering load and a speed sensor responds to the speed of the vehicle.

Electrically powered rear wheel steering systems typically utilize a control module for operating the electric prime mover, which commonly comprise geared rotary types of motors. In these systems, if one of the associated sensors has failed or if the wiring to the electric motor is cut or broken, undesirable and possibly hazardous situations such as uncontrollable steering of the rear roadwheels may result. Therefore, there is a need to prevent the uncontrollable steering of the rear roadwheels of the vehicle in the event of a power supply failure to the electric prime mover of the steering system.

One example of a means for preventing the uncontrollable steering of the rear roadwheels in the event of a power failure is proposed in U.S. Pat. No. 4,782,907. The '907 patent provides a motor-driven power steering system for the front and rear roadwheels of a vehicle to steer the rear roadwheels in response to steering conditions of the front roadwheels. The system comprises a geared rotary motor electrically connected to an electrical power source, various vehicle operating parameter sensors, and an electromagnetic brake for braking the operation of the geared rotary motor to lock the steering motion of the rear roadwheels when the electric power supply to the electromagnetic brake is interrupted. A control unit receives output signals from the sensors and controls the electric power supply from the power source to the motor and the electromagnetic brake to lock the rear wheels to provide a fail-safe operation allowing steering of the vehicle through the front wheels, responsive to a failure of any one of the sensors or electrical connections of the system.

The locking mechanism of the '907 system is only conceptually described. The control unit of the '907 system comprises a fail-safe relay inserted in a power line for electrically connecting the electric power source with the motor and the electromagnetic brake to establish, when switched on, an electrical connection therebetween and interrupt the electrical connection when switched off. The fail-safe relay is switched on to supply power to the motor and the brake when there is no failure in the steering system and switched off to interrupt the electrical power supply to the motor and the brake when the steering system has failed. The electromagnetic brake is actuated to lock the rear roadwheels against steering when a failure is detected in any of the sensors, the electric power source and/or electrical connections between the sensors and the control unit or between the electric power source and the motor.

However, the '907 patent fails to disclose the structural elements or the components of the electromagnetic brake assembly, instead disclosing the elements of the control unit. The '907 patent fails to teach or suggest the use of a linear electric motor to steer the rear roadwheels of a vehicle and teaches that the electromagnetic brake is of a non-electromagnetically actuated type, but does not disclose how the brake functions to affect the locking of the motor. The gearing for such a rotary type motor is costly and often quite complex. It is an advantage of the present invention that all such motor gearing and the rotary motor itself are replaced with a linear motor having but a single major moving component.

It is an object of the present invention to provide a linear motor-equipped steering gear suitable for steering the rear roadwheels of the vehicle equipped with four-wheel steering, the linear motor having a locking mechanism to prevent uncontrollable steering in the event of a power failure of the system.

Further objects, features and advantages of the present invention will become apparent to those skilled in the art in view of this specification.

SUMMARY OF THE INVENTION

There is disclosed herein a steering gear for an automotive vehicle comprising a linear electric motor electrically connected to a power source within the vehicle. The motor includes a housing, a plunger operative to move reciprocally within a stator, the plunger being linked to an axle set of roadwheels. The motor further includes a locking member meshingly engagable with the plunger and means for driving the locking member into meshing engagement with the plunger upon interruption of electrical power to the linear motor to prevent the plunger from reciprocally moving within the stator. In one embodiment of the present invention, the means for driving the locking member to meshing engagement with the plunger comprises a spring interposed between the locking member and a coil of current-carrying wire electrically connected to the power source such that in the event that electrical power is disconnected from the coil, the spring urges the locking member into engagement with the plunger.

There is also disclosed herein a steering gear for an automotive vehicle comprising a linear electric motor, the motor including a plunger adapted to slidably reciprocate within the stator, the plunger being linked to a pair of roadwheels of the vehicle and including a first set of gear teeth formed integrally thereon operative to meshingly engage a pinion connected to a steering shaft. The motor further includes detection means operative to generate a signal indicative of the location of the plunger within the stator as well as a locking member meshingly engageable with the plunger and means for driving the locking member into meshing engagement with the plunger upon interruption of electrical power to the linear motor to prevent the plunger from reciprocally moving within the stator. The steering gear further includes a controller for operating the linear motor according to various operating parameters encountered by the vehicle. The locking member and means for driving the locking member to meshing engagement with the plunger of this embodiment are generally similar to that described above.

BRIEF DESCRIPTION OF THE DRAWINGS

Reference will now be made to the following drawings in which.

DESCRIPTION OF THE PREFERRED EMBODIMENTS

Figure 1:
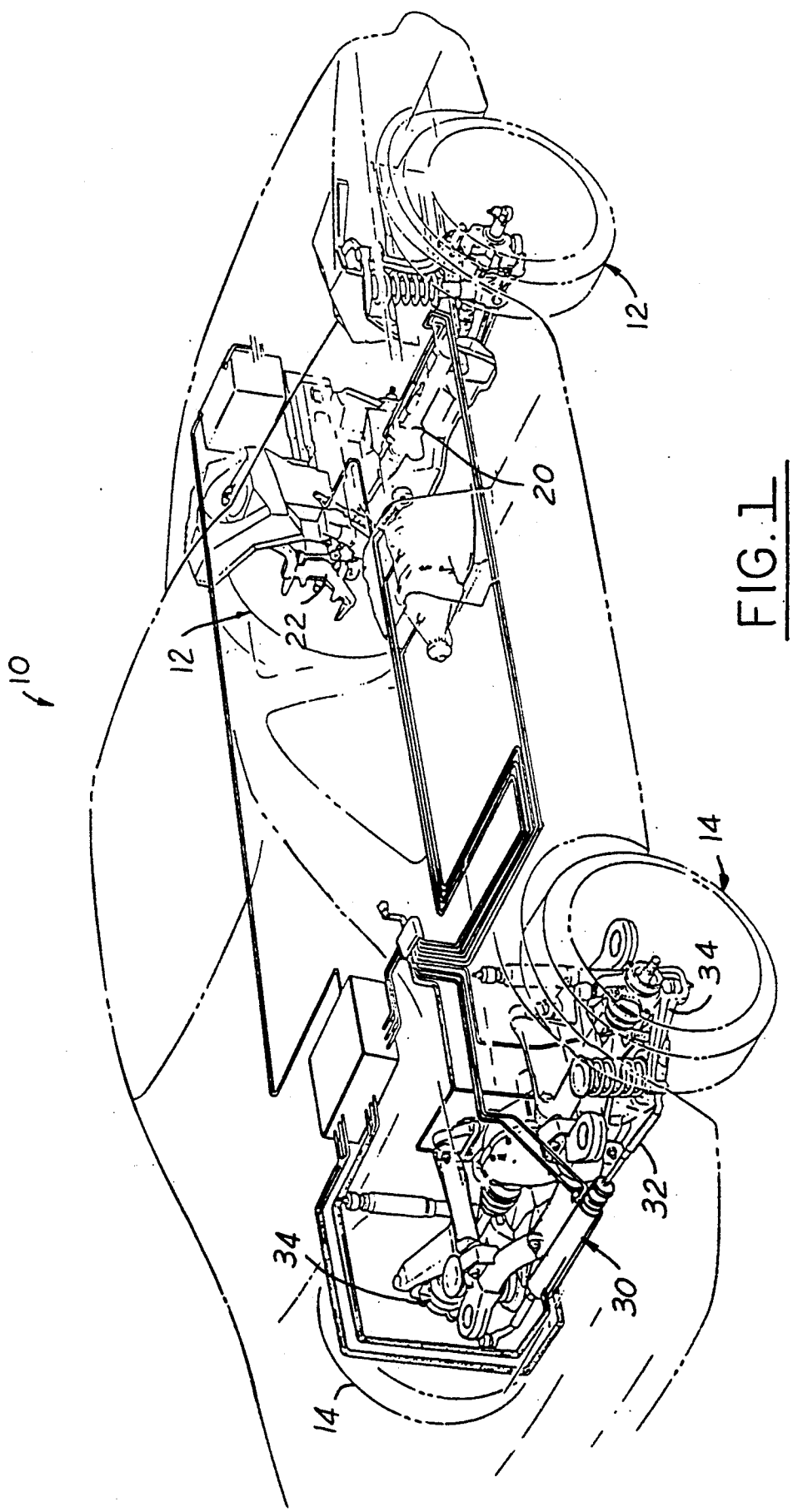
FIG. 1 is a perspective view of an automotive vehicle incorporating a steering gear system according to the present invention.
Figure 2:
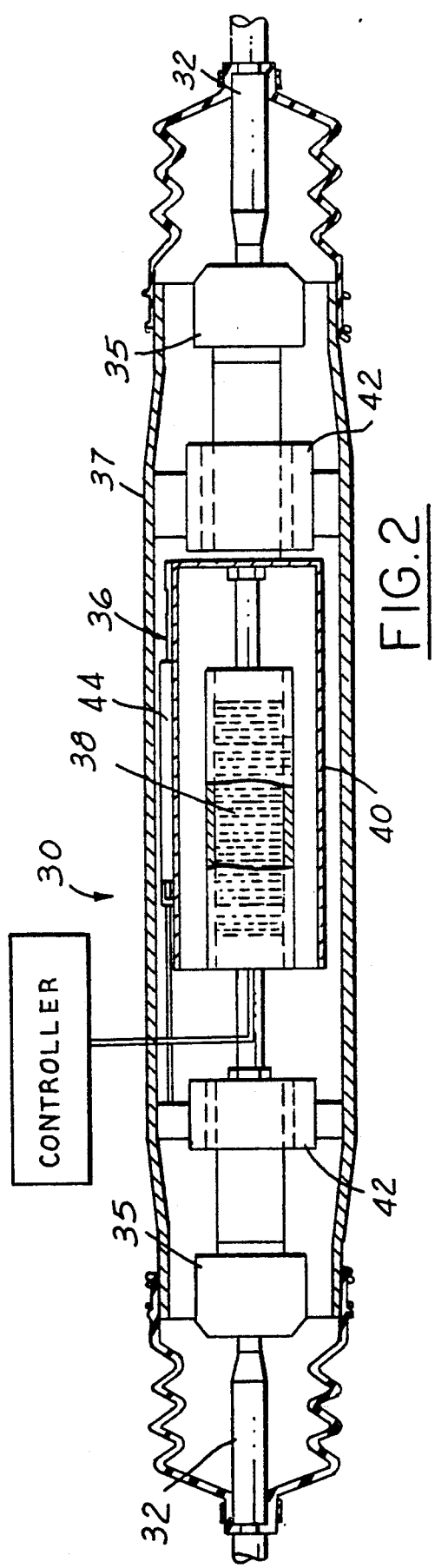
FIG. 2 is a partially schematic view of a steering gear incorporating a linear motor according to the present invention.

Referring now to the drawings, FIG. 1 shows a vehicle 10 equipped with front roadwheels 12 and rear roadwheels 14. The front roadwheels are steered by front steering gear 20, whereas the rear roadwheels are steered by rear steering gear 30. Front steering gear 20 operates roadwheels 12 by providing steering inputs to front spindles 22 via tierods (not shown). Conversely, rear steering gear 30 provides steering inputs to rear spindles 34 by means of tierods 32. Tierods 32 are shown as extending from steering gear 30 in FIG. 2. Steering gear 30 comprises inner tierod ends 35 which provide a pivotable attachment for joining the balance of the steering gear to tierods 32. Steering gear 30 further comprises a linear electric motor 36, the motor 36 including a plunger 38 mounted reciprocably within a stator 40. The linear electric motor 36 is disposed within a housing 37 of the steering gear 30.

Linear motor 36 is a DC moving magnet motor in which the plunger 38 is attached to a moving magnet assembly. Stator 40 comprises a support structure and coil assemblies. Force in the linear motor is caused by the interaction between an applied magnetic field in one member (in this case, the stator 40), and the permanent magnet in the second member, (in this case, the plunger 38) on the other side of a separating air gap. Plunger 38 conventionally comprises the moving magnet assembly and tie rod attachments. As noted above, plunger 38 is slidably carried within stator 40 by bearings 42, the stator 40 being mounted rigidly to the chassis of the vehicle 10.

In response to signals from a system control module 46, plunger 38 will be caused to move reciprocably within stator 40, and as a result the roadwheels attached to the spindles steered by tierods 32 will in turn be steered. Linear motor 36 further includes a resolver 44 which performs two functions in conjunction with control module 46. The first function performed jointly by the resolver and the control module is electronic commutation of linear motor 36. In other words, resolver 44 allows system control module 46 to know the position of plunger 38 within stator 40 so that appropriate currents may be supplied to the stator's windings. The second function performed by the resolver and control module stems from the first function. Since the resolver allows the system control module to know the precise position of the plunger at all times, the steering condition of the roadwheels steered by the present steering gear will be known by the system control module. As a result, the control module will have information necessary to allow operation of the system. More specifically, resolver 44 advises control module 46 whenever the plunger has come to the end of its travel in either direction, as well as keeping precise track of the location of the plunger at any intermediate position.

The control module comprises a microprocessor including a ROM storing various constants and control programs for controlling the steering gear. The microprocessor further includes a CPU for reading out control programs from the ROM to execute required operations and a RAM which temporarily stores various data related to the operations to be executed within the CPU and which allows the CPU to read out the data stored therein. Finally, the control module includes input-output devices and power supplies for operating linear motor 36.

Figure 3:
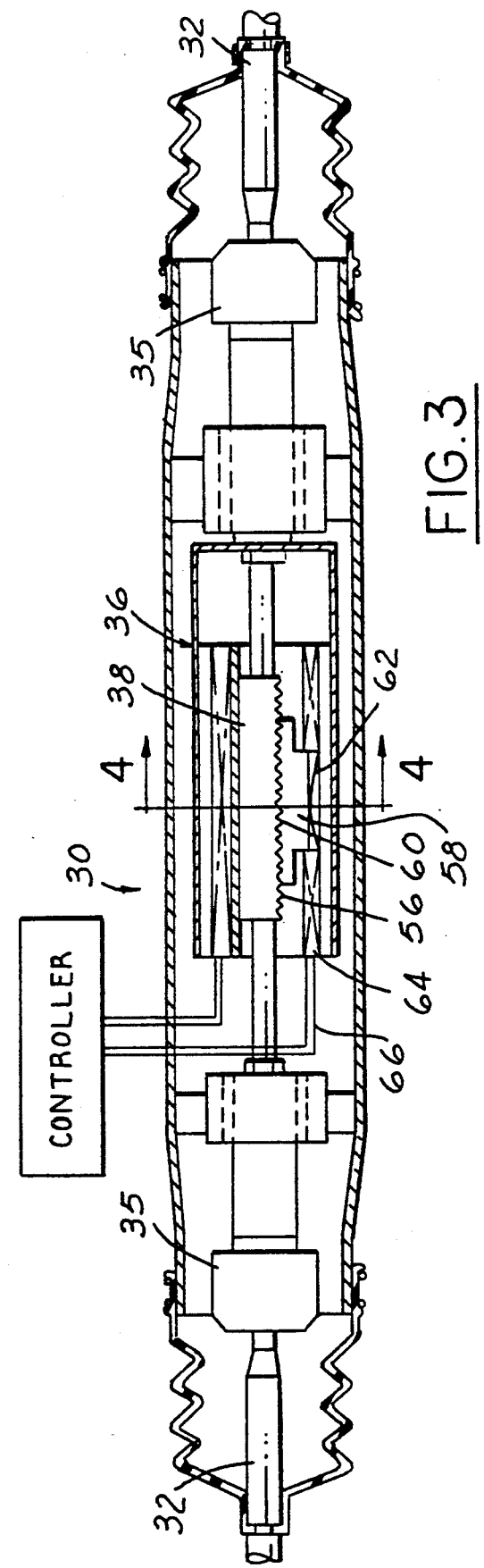
FIG. 3 is a partially schematic, side elevational view of the steering gear of FIG. 2.
Figure 4:
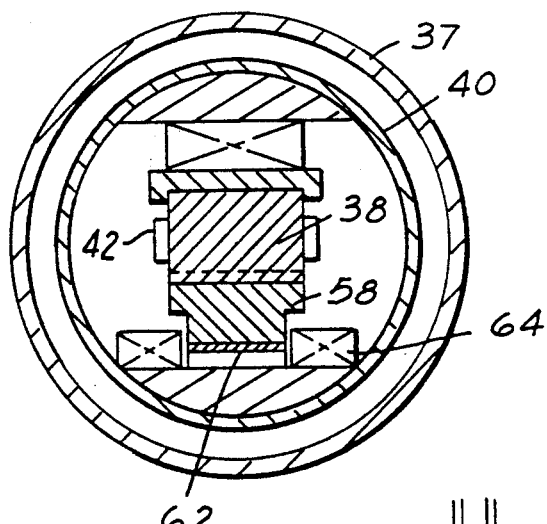
FIG. 4 is a cross-sectional view along line 4—4 of FIG. 3.

As shown in FIGS. 3 and 4, the steering gear 30, and more particularly linear motor 36, further includes a locking mechanism to lock the position of plunger 38 within stator 40 to prevent the plunger from reciprocally moving within the stator 40 in the event of a power failure to the motor 36 or due to vehicle operating parameters as determined by the controller 46. Plunger 38 includes a plurality of geared teeth 56 which meshingly engage the geared teeth 60 of a locking member 58. As depicted in FIG. 3, the plunger 38 is locked against reciprocal movement by means of the meshing engagement of the geared teeth 56 and 60.

The linear motor 36 further includes means for driving the locking member 58 into meshing engagement with the plunger 36, such as leaf spring 62. A coil of current-carrying wire 64 surrounds a portion of the locking member 56 so that when energized, the coil 64 induces an electromagnetic field that causes locking member 58 to move axially away from plunger 38. When this occurs, the plunger 38 is free to reciprocate within stator 40 to steer the roadwheels of the vehicle. When current is disconnected from the coils 64 either due to a power failure within the steering gear 30 or due to a decision from the controller based upon various vehicle operating parameters such as speed or front steering gear torque as will be described below, the electromagnetic field is deenergized and the spring 62 urges the locking member into meshing engagement with plunger 38 to prevent reciprocal movement of the plunger within the stator. In the embodiment shown in FIGS. 3 and 4, the plunger may be fabricated from a nonmagnetic responsive material while the locking member is fabricated from a magnetic responsive material so that energizing the coil 64 retracts the locking member from the plunger. A variety of known materials may be used for fabricating the plunger and the locking member to facilitate this purpose.

Figure 5:
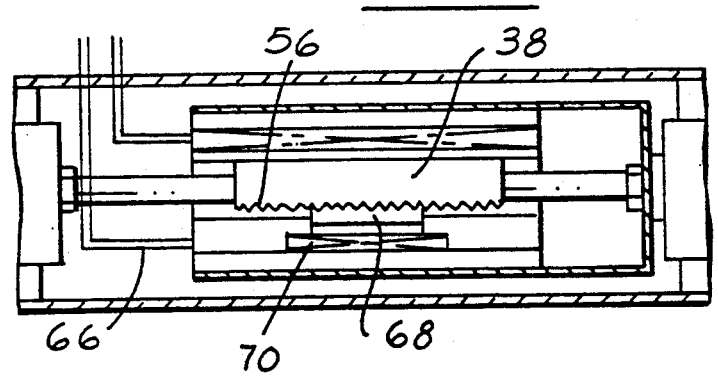
FIG. 5 is a cross-sectional, side elevational view of a second embodiment of a portion of a steering gear incorporating a linear motor structured in accord with the principles of the present invention.

FIG. 5 shows an alternative embodiment of the present invention wherein the plunger 38 includes a plurality of geared teeth 56 as described above, but the locking mechanism comprises a permanent magnet 68 having a plurality of geared teeth disposed thereon for meshing engagement with the geared teeth 56 of plunger 38. A coil of current-carrying wire 70 is disposed beneath the locking member 68 but within stator 40. When energized, the coil 70 induces an electromagnetic field that causes locking member 68 to retract and allow plunger 38 to move reciprocally within stator 40. In this embodiment, the plunger 38 must be manufactured from a magnetic responsive material so that in the event of a power failure to the steering gear 30, the locking member 68, being formed of a permanent magnet, is magnetically attracted to plunger 38 to lock the plunger 38 against reciprocal movement. The need for a spring to urge a locking member into meshing engagement with a plunger is obviated since magnetic attraction of the permanent magnet locking member 68 and the magnetic responsive plunger causes the meshing engagement of the members to prevent reciprocal movement of the plunger and therefore prevent uncontrollable steering of the rear wheels of the vehicle.

Figure 6:
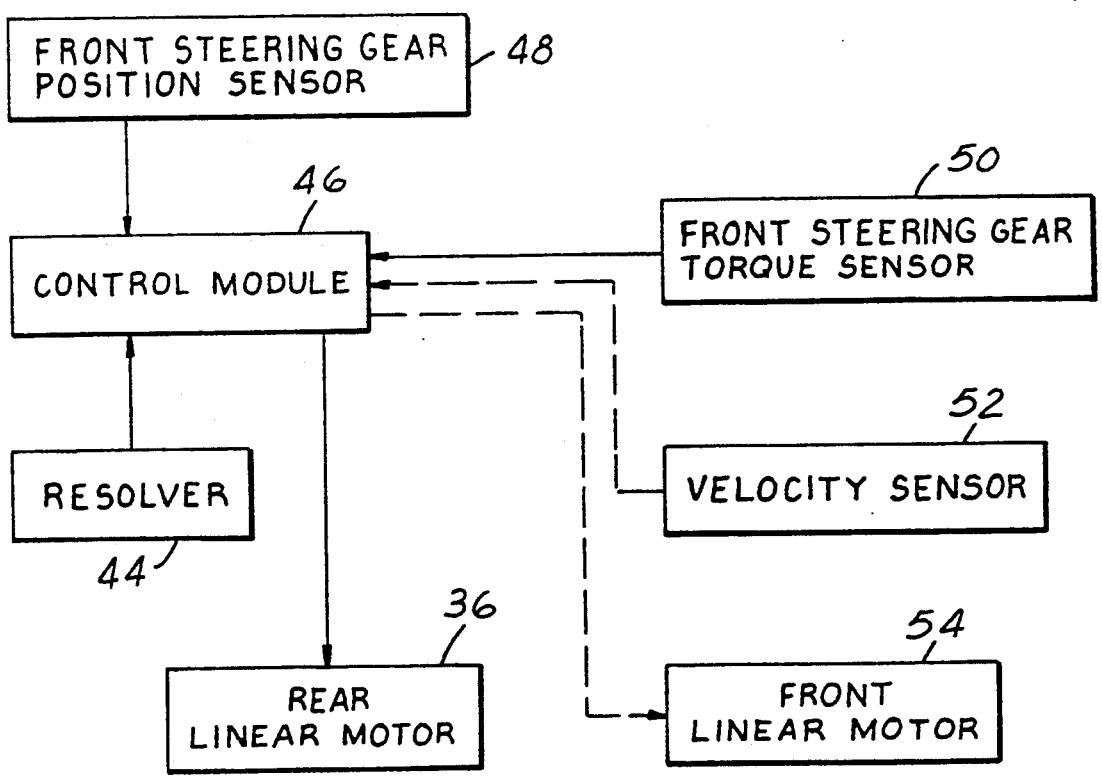
FIG. 6 is a system block diagram showing the component parts of a four-wheel steering system employing a linear motor according to the present invention.

As shown schematically in FIG. 6, in the event that a steering gear having a linear electric motor as its prime mover is used for the purpose of steering the rear wheels of a vehicle according to the present invention in conjunction with a conventional front steering gear, system control module 46 will receive inputs only from front steering gear position sensor 48, which detects the steering operating position of the front wheels, and resolver 44. If, however, both front and rear steering gears are equipped with linear electric motors, system control module 46 will receive further inputs from front steering gear torque sensor 50 and vehicle velocity sensor 52. The inputs from front steering gear torque sensor 50 and velocity sensor 52 will permit control module 46 to operate front steering gear linear motor 54 by providing a motor control signal dependent upon the driver's torque input to the steering shift and the speed of the vehicle.

Those skilled in the art will appreciate in view of this disclosure that a variety of known control algorithms could be employed for linking the front and rear steering gears of a vehicle using linear motors according to the present invention. For example, the rear steering gear could be operated to steer the rear wheels out of phase at lower speeds, neutrally at medium speeds, and in phase with the front wheels at higher road speeds. It should be understood that the control scheme chosen for the front steering gear will depend upon the individual dictates of the vehicle being considered for such a system. Similarly, the precise form of linear motor chosen for implementing a system according to this invention may change with the individual requirements of the vehicle. For example, the stator and plunger could both be wound, or the plunger only could be wound, with the stator comprising a permanent magnet. Furthermore, the meshing teeth of the locking mechanism could be replaced with friction surfaces known in the art to prevent the plunger from reciprocating within the stator upon engagement of the friction surfaces. Also, the locking mechanism of the present invention could be employed on linear electric motors used in applications other than as a steering gear for the rear wheels of a vehicle. It will thus be further understood that the invention herein is not to be limited to the exact construction shown and described and that various changes and modifications may be made without departing from the spirit and scope of the invention as defined by the appended claims.

What is claimed is:

1. A steering gear for an automotive vehicle comprising a linear electric motor electrically connected to a power source within said vehicle, said motor comprising:
   a housing enclosing a stator;
   a plunger operative to move reciprocally within said stator, said plunger being linked to an axle set of roadwheels;
   a locking member meshingly engageable with said plunger; and
   means for driving said locking member into meshing engagement with said plunger upon interruption of electrical power to said linear motor to prevent said plunger from reciprocally moving within said stator.

2. A steering gear according to claim 1, wherein said locking member includes a plurality of geared teeth adapted to engage a plurality of geared teeth disposed on said plunger.

3. A steering gear according to claim 1, wherein said means for driving said locking member into meshing engagement with said plunger comprises a coil of current-carrying wire and a spring interposed between said locking member and said coil of current-carrying wire electrically connected to said power source such that in the event that electrical power is disconnected from said coil, said spring urges said locking member into engagement with said plunger.

4. A steering gear according to claim 2, wherein said locking member is fabricated from a magnetic responsive material.

5. A steering gear according to claim 4, wherein said plunger is fabricated from a nonmagnetic responsive material.

6. A steering gear according to claim 3, wherein said plunger is fabricated from a magnetic responsive material.

7. A steering gear according to claim 6, wherein said means for driving said locking member into meshing engagement with said plunger comprises a permanent magnet having a plurality of geared teeth disposed thereon for meshing engagement with a plurality of geared teeth integral with said plunger.

8. A steering gear according to claim 7, wherein said permanent magnet is interposed between said plunger and said coil of current-carrying wire disposed within said stator such that said coil, under a current from said power source, retracts said locking member and in the event that electrical power is disconnected from said coil, said locking member is attracted to said magnetic responsive plunger and is operative to lock said plunger from reciprocal movement within said stator.

9. A steering gear according to claim 1, further including a controller for operating said steering gear according to a plurality of operating parameters.

10. A steering gear according to claim 9, wherein said means for driving said locking member into said plunger is electrically connected to said controller.

11. A steering gear according to claim 1, wherein said motor further comprises detecting means operative to generate a signal indicative of the position of the plunger within said stator.

12. A steering system for steering the rear roadwheels of an automotive vehicle, said system including a linear electric motor electrically connected to a power source within said vehicle, said motor comprising:
- a housing enclosing a stator;
- a plunger fabricated from a non-magnetic responsive material and operative to move reciprocally within a stator, said plunger being linked to an axle set of roadwheels and having said set of geared teeth disposed thereon;
- a locking member meshingly engageable with said plunger, said locking member including a plurality of geared teeth adapted to engage said set of geared teeth of said plunger; and
- means for driving said locking member into meshing engagement with said plunger upon interruption of electrical power to said linear motor, said means comprising a coil of current-carrying wire electrically connected to said power source and a spring interposed between said locking member and said coil such that in the event that electrical power is disconnected from said coil, said spring urges said locking member into engagement with said plunger to prevent said plunger from reciprocally moving within said stator.

13. A steering system for steering the rear roadwheels of an automotive vehicle, said system including a linear electric motor electrically connected to a power source within said vehicle, said motor comprising:
- a housing enclosing a stator;
- a plunger fabricated from a magnetic responsive material and operative to move reciprocally within said stator, said plunger being linked to an axle set of roadwheels and having a set of geared teeth disposed thereon;
- a locking member meshingly engageable with said plunger, said locking member comprising a permanent magnet having a plurality of geared teeth integral therewith for meshing engagement with said set of geared teeth of said plunger; and
- means for driving said locking member into meshing engagement with said plunger upon interruption of electrical power to said linear motor, said means comprising a coil of current-carrying wire electrically connected to said power source disposed within said stator such that said coil, under a current from said power source, retracts said locking member from said plunger and in the event that electrical power is disconnected from said coil, said locking member is attracted to said magnetic responsive plunger to lock said plunger from reciprocal movement within said stator.

* * * * *